United States Patent
Xu et al.

(10) Patent No.: US 9,313,073 B2
(45) Date of Patent: Apr. 12, 2016

(54) ADAPTIVE PHASE SHIFT APPARATUS AND METHOD

(75) Inventors: Yuanjun Xu, Beijing (CN); Tao Gu, Beijing (CN); Huaisong Zhu, Beijing (CN); Yanqiang Li, Beijing (CN); Jinsong Yang, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/371,232

(22) PCT Filed: Jan. 12, 2012

(86) PCT No.: PCT/CN2012/000055
§ 371 (c)(1),
(2), (4) Date: Jul. 9, 2014

(87) PCT Pub. No.: WO2013/104082
PCT Pub. Date: Jul. 18, 2013

(65) Prior Publication Data
US 2014/0355727 A1    Dec. 4, 2014

(51) Int. Cl.
*H04L 27/26* (2006.01)
*H04W 88/08* (2009.01)

(52) U.S. Cl.
CPC ........ *H04L 27/2657* (2013.01); *H04L 27/2621* (2013.01); *H04L 27/2689* (2013.01); *H04W 88/08* (2013.01)

(58) Field of Classification Search
CPC ............ H04L 27/2621; H04L 27/2614; H04L 27/2657; H04L 27/2689
USPC ........................................................ 375/296
See application file for complete search history.

(56) References Cited

U.S. PATENT DOCUMENTS

| | | | | |
|---|---|---|---|---|
| 5,302,914 A | * | 4/1994 | Arntz ................. | H03F 1/34 330/124 R |
| 6,125,103 A | * | 9/2000 | Bauml ............. | H04L 27/2602 370/203 |

(Continued)

FOREIGN PATENT DOCUMENTS

| CN | 1802831 | 7/2006 |
|---|---|---|
| CN | 1956433 | 5/2007 |

(Continued)

OTHER PUBLICATIONS

International Search Report, Application No. PCT/CN2012/000055, Oct. 18, 2012, 2 pages.

(Continued)

*Primary Examiner* — Sophia Vlahos
(74) *Attorney, Agent, or Firm* — Nicholson De Vos Webster & Elliott LLP

(57) ABSTRACT

The invention discloses an adaptive phase shift method in a multi-carrier system, comprising: generating a group of one or more new phase values for corresponding one or more phase shift carriers, PSCs, based on quantization phase values; calculating and comparing a backward maximum power in an evaluation path with the group of one or more new phase values in one timeslot and a forward maximum power in a working path with current phase values in the timeslot; and adjusting phase of the PSCs based on the group of one or more new phase values if the calculated backward maximum power is less than the calculated forward maximum power. An adaptive phase shift apparatus is also disclosed. With the invention, complexity of the implementation is reduced and a small DPS block resource, low Hardware cost, low power consumption is also achieved.

17 Claims, 4 Drawing Sheets

(56) References Cited

U.S. PATENT DOCUMENTS

| | | | | |
|---|---|---|---|---|
| 7,313,196 | B1* | 12/2007 | Hall | G06F 7/4818 375/296 |
| 7,321,629 | B2* | 1/2008 | Feng | H04L 1/0041 375/259 |
| 7,391,713 | B2* | 6/2008 | Anvari | H04L 27/2621 370/206 |
| 7,961,591 | B2* | 6/2011 | Abedi | H04L 27/2614 370/208 |
| 8,009,764 | B2* | 8/2011 | Kwon | H04L 27/2621 375/296 |
| 8,509,345 | B2* | 8/2013 | Farrokhi | H04L 27/2621 340/426.2 |
| 8,571,000 | B2* | 10/2013 | Zhou | H04L 27/2621 370/344 |
| 2006/0274868 | A1* | 12/2006 | Chen et al. | 375/347 |
| 2008/0112496 | A1* | 5/2008 | Devlin | H03F 1/32 375/260 |
| 2009/0003308 | A1* | 1/2009 | Baxley | H04B 1/59 370/350 |
| 2009/0310710 | A1* | 12/2009 | Farrokhi | 375/302 |
| 2011/0199889 | A1* | 8/2011 | Han et al. | 370/210 |

FOREIGN PATENT DOCUMENTS

| | | |
|---|---|---|
| CN | 101512945 | 8/2009 |
| EP | 1 909 447 A1 | 4/2008 |
| WO | 2010/062230 A1 | 6/2010 |

OTHER PUBLICATIONS

International Preliminary Report on Patentability, Application No. PCT/CN2012/000055, Jul. 15, 2014, 6 pages.

European Search Report for Application No. 12865057.9, mailed Jun. 15, 2015, 8 pages.

Han et al., "Modulation, Coding and Signal Processing for Wireless Communications—An Overview of Peak-To-Average Power Ratio Reduction Techniques for Multicarrier Transmission," IEEE Wireless Communications, vol. 12, No. 2, Apr. 1, 2005, pp. 56-65.

* cited by examiner

ADAPTIVE PHASE SHIFT APPARATUS AND METHOD

CROSS-REFERENCE TO RELATED APPLICATIONS

This application is a National stage of International Application No. PCT/CN2012/000055, filed Jan. 12, 2012, which are hereby incorporated by reference.

TECHNICAL FIELD

The invention generally relates to multi-carrier system, in particular to an adaptive phase shift apparatus and method in multi-carrier systems.

BACKGROUND

In the multi-carrier systems, the data Peak-to-Average power Ratio (PAR) after carrier combination is very high. For example, in TD-SCDMA, all users and carriers in one cell use the same Basic Mid-amble Index (BMI). Due to high BMI correlation of different users and carriers, PAR of mid-amble code is extremely high when the number of carriers increases. High PAR is a great challenge to the multi-carrier systems.

Conventionally, there are two phase shift approaches to reduce PAR: Static Phase Shift (SPS) and Dynamic Phase Shift (DPS). SPS uses a static phase table to adjust the phase offset for every carrier, while DPS uses a dynamic phase table calculated according to real-time data stream to reduce PAR. Generally, the performance of DPS is better than SPS by tracing the characteristics of data stream.

The existing various DPS approaches are implemented in baseband units. Many complicated processing functional blocks for evaluating PAR, such as DUC, CC, PAR and phase searching, are required. They increase the complexity of Software and Hardware implementation.

Further, the existing DPS approaches implemented in baseband can not deal with PAR fluctuation caused by the frequency quantization error in Numerical Controlled Oscillators (NCO) which is implemented in Digital Front End (DFE). NCO is always implemented by a look-up table approach, but there are quantization errors in phase step. Although this phase error is very small, it can be accumulated so as to impact relative phase among different carriers. Even if a best group of phases is found for all carriers, the relative phases will fluctuate periodically. The fluctuation cycle is some seconds or several minutes which is relative to the frequency error value.

SUMMARY

Accordingly, the invention seeks to preferably mitigate, alleviate or eliminate one or more of the above mentioned disadvantages singly or in any combination.

To solve one or more of the above problems, this disclosure introduces a novel adaptive phase shift method and apparatus thereof to reduce PAR. The adaptive phase shift apparatus and method according to embodiments of the present invention will search the optimal phases for some carriers in real-time.

In particular, in a first aspect of the invention, there is provided an adaptive phase shift method in a multi-carrier system, comprising: generating a group of one or more new phase values for phase shift carriers, PSCs, based on quantization phase values; calculating and comparing a backward maximum power in an evaluation path with the group of one or more new phase values in one timeslot and a forward maximum power in a working path with current phase values in the timeslot; and adjusting phase of the PSCs based on the group of one or more new phase values if the calculated backward maximum power is less than the calculated forward maximum power.

In an embodiment, generating a group of one or more new phase values comprises searching for the group of one or more new phase values in a phase quantization look up table.

In an embodiment, the method is implemented in a Digital Front End.

In an embodiment, a number of PSCs' phases are adjusted in parallel in one time, and the number is smaller than the number of all carriers in the system.

Preferably, the number may be much smaller than the number of all carriers in the multi-carrier system.

In an embodiment, calculating the backward maximum power comprises calculating power for each sample data in one timeslot based on the group of one or more new phase values after combination of all carriers; and determining the maximal power among the calculated powers for all the sample data in the timeslot as the backward maximum power.

calculating the forward maximum power comprises calculating power for each sample data in one timeslot based on the current phase values after combination of all carriers; and determining the maximal power among the calculated powers for all the sample data in the timeslot as the forward maximum power.

All steps of the method are performed in a cyclic manner until exhaustively searching all groups of one or more new phase values in the phase quantization look up table.

In an embodiment, the method further comprises restarting searching after one exhaustive searching is finished.

In a second aspect of the invention, there is provided an adaptive phase shift apparatus for in a multi-carrier system, comprising: a new phase generator, configured for generating a group of one or more new phase values for phase shift carriers, PSCs, based on quantization phase values; a Max power comparison unit, configured for calculating and comparing a backward maximum power in an evaluation path with the group of one or more new phase values in one timeslot and a forward maximum power in a working path with current phase values in the timeslot; and a forward phase shift unit, configured for adjusting phase of the PSCs based on the group of one or more new phase values if the calculated backward maximum power is less than the calculated forward maximum power.

In an embodiment, the new phase generator is preferably configured for searching for the group of one or more new phase values in a phase quantization look up table.

In an embodiment, the apparatus is implemented in a Digital Front End.

In an embodiment, the forward phase shift unit is configured to adjust a number of PSCs' phases in parallel in one time, and the number is smaller than the number of all carriers in the system. Preferably, the number may be much small than the number of all carriers in the multi-carrier system.

In an embodiment, the Max power comparison unit is configured for calculating power for each sample data in one timeslot based on the group of one or more new phase values after combination of all carriers; and determining the maximal power among the calculated powers for all the sample data in the timeslot as the backward maximum power.

The Max power comparison unit is configured for calculating power for each sample data in one timeslot based on the current phase values after combination of all carriers; and determining the maximal power among the calculated powers for all the sample data in the timeslot as the forward maximum power.

In a third aspect of the invention, there is provided a base station comprising the adaptive phase shift apparatus of the invention.

According to the embodiments of the invention, using maximum power searching instead of PAR calculating reduces complexity of the implementation. Simulation results prove its good performance.

A small Dynamic Phase Shift (DPS) block resource, low hardware cost, low power consumption may be achieved due to the implementation in DFE instead of in baseband.

The NCO frequency quantization error problem may also be solved with the solutions of the invention.

BRIEF DESCRIPTION OF THE DRAWINGS

The features and advantages of the invention will be more apparent from the following exemplary embodiments of the invention with reference to the accompanied drawings, in which.

DETAILED DESCRIPTION

Embodiments of the invention will be described thoroughly hereinafter with reference to the accompanied drawings. It will be apparent to those skilled in the art that the invention may, however, be embodied in many different forms and should not be construed as limited to the embodiments and specific details set forth herein. Like numbers refer to like elements throughout the description.

Embodiments of the invention may be applied in various wireless networks, such as WCDMA, GSM, 3GPP LTE etc. Given the rapid development in communications, there will of course also be future type wireless communications technologies and systems with which the present invention may be embodied. It should not be seen as limiting the scope of the invention to only the aforementioned system.

Figure 1:
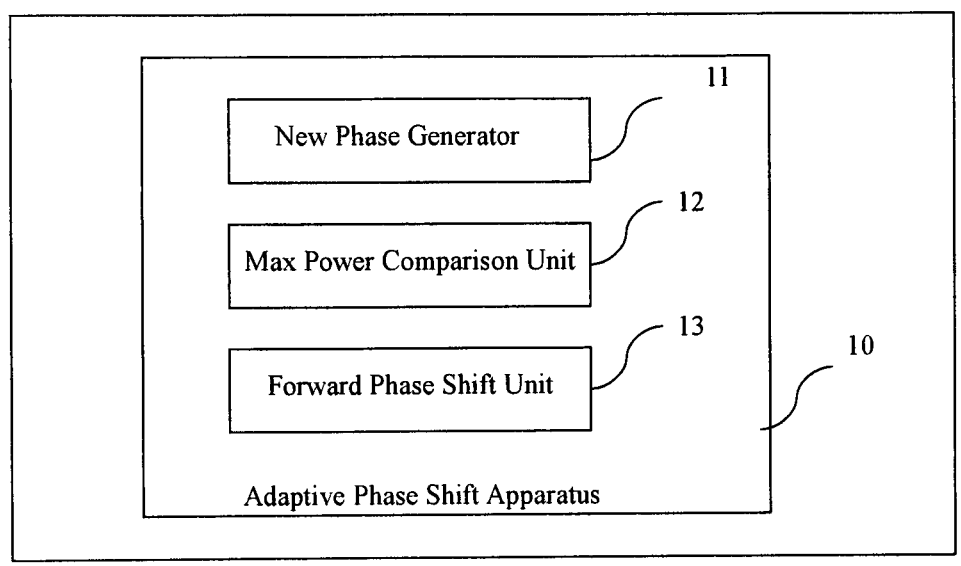
FIG. 1 illustrates a schematic diagram structure of an adaptive phase shift apparatus for a multi-carrier system according to an embodiment of the invention.

FIG. 1 illustrates a schematic diagram structure of an adaptive phase shift apparatus for a multi-carrier system (e.g., N carriers, N is a natural number) according to an embodiment of the invention.

As shown in FIG. 1, the adaptive phase shift apparatus 10 in an embodiment includes a new phase generator 11, a Max power comparison unit 12 and a forward phase shift unit 13.

The new phase generator 11 may generate a group of new phase values for Phase Shift Carriers (PSCs) based on quantization phase values. Here, the PSCs refers to one or more carriers (e.g., M carriers, M<=N) to be phase-shifted within N carriers in the N-carrier system. Any carriers in the N-carrier system can be selected as PSCs. To adjust the M PSCs, a group of new phase values (i.e., M phase values) is to be generated corresponding to the M PSCs.

In an embodiment, the new phase generator 11 may search for a group of new phase values in a phase quantization look up table. The searched group of new phase values is output to the Max power comparison unit 12 for power calculation and comparison. The new phase generator 11 may search exhaustively for new phase values by group in the phase quantization look up table. With the power calculation and comparison by the Max power comparison unit 12, an optimal group of new phase values may be determined, which is then output to the forward phase shift unit 13 for setting or adjusting the phase of PSCs.

The new phase generator 11 may also be configured with initial phase values (for example, N initial phase values). The initial phase values may be set e.g., as empirical values, simulated values manually or in various manners.

The Max power comparison unit 12 may calculate and compare a maximum power in an evaluation path (i.e., backward maximum power) with the group of new phase values in one timeslot and a maximum power in a working path (i.e., forward maximum power) with current phase values in the timeslot.

In the context, the evaluation path refers to the path receiving the group of new phase values generated by the new phase generator 11 which is then applied to the sample data of PSCs for calculating the backward power and evaluating the backward maximum power; the working path refers to the path receiving the sample data with the current phase value from the point after combination of all N carriers, for calculating the forward power and evaluating the forward maximum power.

One time-slot is a period of searching for one group of new phase values and is divided into a plurality of sample data (e.g., q). In particular, the Max power comparison unit 12 calculates forward powers (i.e., powers in the working path) and backward powers (i.e., powers in the evaluation path) for the plurality of sample data in one timeslot, finds the maximum power in the working path and in the evaluation path separately and compare them and then decide if the group of new phase values is used to set the phase of the PSCs.

In an embodiment, particularly, the Max power comparison unit 12 may calculate power, after combination of all N carriers, for each sample data in one timeslot based on a group of new phase values input by the new phase generator 11, and determine the maximal power among the calculated powers (i.e., q powers) for all the sample data in the timeslot as the backward maximum power.

Similarly, the Max power comparison unit 12 may calculate power, after combination of all N carriers, for each sample data in the timeslot based on the current phase values for the N carriers, and determine the maximal power among the calculated powers (i.e., q powers) for all the sample data in the timeslot as the forward maximum power.

According to the embodiments of the invention, using maximum power searching instead of PAR calculating reduces significantly complexity of the implementation.

Figure 2:
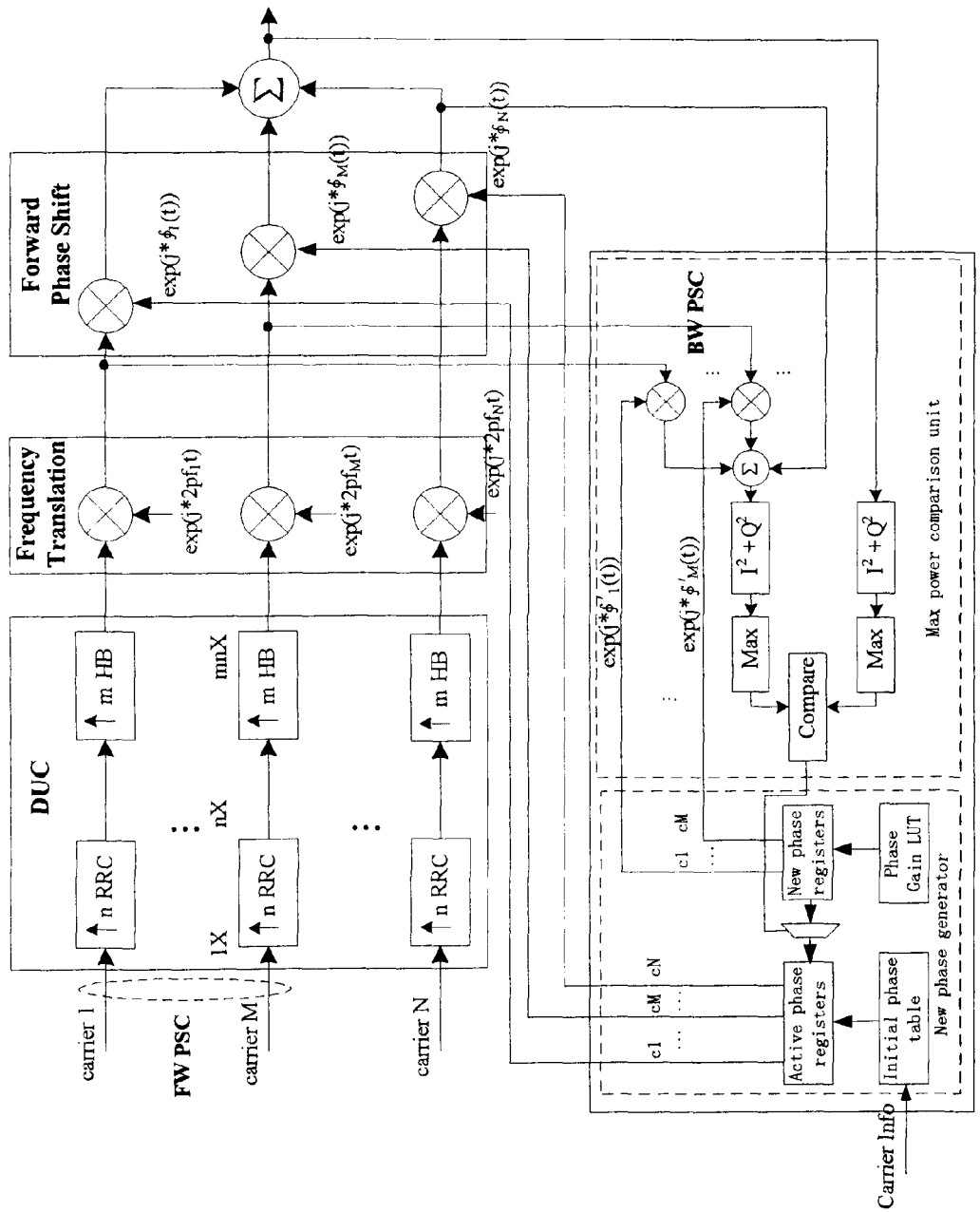
FIG. 2 illustrates an exemplary implementation of an adaptive phase shift apparatus for a multi-carrier system according to an embodiment of the invention.

In the context, the term "combination" may be represented by the symbol "Σ" shown in FIG. 2, which means combining multiple input carriers. The term "after combination" generally means at the output after the multiple input carriers are combined.

The forward phase shift unit 13 may adjust phase of the PSCs based on the group of new phase values if the calculated backward maximum power is less than the calculated forward maximum power.

In particular, when the backward maximum power in one timeslot determined by the Max power comparison unit 12 is less than the forward maximum power in the timeslot determined by the Max power comparison unit 12, which means the group of new phase values generated by the new phase generator 11 is better than the current phase values in the working path. That is, the group of new phase values, when applied, may reduce the maximum power in the working path, thus reducing PAR of the system in the sense of statistics.

In the embodiments of the invention, a number of PSCs' (e.g., M PSCs) may be adjusted in parallel in one cycle, and the number M may be much smaller than the number of all carriers (e.g., N carriers) in the system. For example, in an 8-carrier system, 3 carriers (i.e., 3 PSCs) therein may be adjusted simultaneously. It is to be understood that it is not only limited 3 PSCs.

FIG. 2 illustrates an exemplary implementation of an adaptive phase shift apparatus 10 for a multi-carrier (e.g., N carriers) system according to an embodiment of the invention.

Preferably, the adaptive phase shift apparatus 10 is embodied in DFE. DFE is a critical stage in a wireless base station. A small DPS block resource, low Hardware cost, low power consumption may be achieved due to the implementation in DFE instead of in baseband. A number of N carrier data (from Carrier data 1 to carrier data N) are the input baseband data. It is assumed that M carriers (from carrier 1 to carrier M) are carriers of which phase is to be adjusted (M<=N). These M carriers to be adjusted are PSCs.

The Digital Up Converter (DUC) is one of blocks in DFE which is used for converting the sample rate of signals from baseband to intermediate frequency. Conventionally, the frequency translation block also includes forward phase shift function. In the embodiment, the forward phase shift function is extracted from the frequency translation block which only performs frequency translation with fixed initial phase for each carrier. Since the forward phase shift unit 13 for performing the forward phase shift function is provided separately, the signal may be fetched out before the forward phase shift unit 13 and sent to the Max power comparison unit 12 for power calculation and comparison in the evaluation path.

The New phase generator unit 11 may be configured with an initial phase table, a phase gain Look Up Table (LUT), one or more new phase registers, and one or more active phase registers.

The initial phase table may store initial N optimized phases for carrier 1 to carrier N which may result from simulation.

The phase gain LUT stores the quantization phase values of equal portion of 360 degree. As an example, if 360 degree is equally divided into 16 portions, quantization phase values including 0, 2PI/16, 2×2PI/16, . . . 15×2PI/16, may be stored in the LUT.

A group of new phase values for PSCs is searched for from the phase gain LUT and used to set the new phase register. The group of new phase values includes the M phase values applied to carrier 1 to carrier M concurrently. All groups of M phase values for the M PSCs are to be searched one time. As an example, if M equals 3, and phase is quantized as 16 equal portions, a total of $N_{total}$ groups (Ntotal=16×16×16) will be searched out from [0, 0, 0] to [15×2PI/16, 15×2PI/16, 15×2PI/16].

The group of new phase values, when applied to PSCs, making the maximum power in the evaluation path less than the maximum power in the working path after the combination of all carriers of the N-carrier system, will be stored in the active phase register to update the corresponding M initial phase values for PSCs. The remaining N−M phase values for other carriers than PSCs are in accordance with the respective values in the initial phase table. Then, all N phase values are fed to the forward phase shift unit 13 as the working phases for the N carriers.

It is understood from above that the searching process in an embodiment of the invention separates with the forward data path (i.e., working path), and thus no extra processing delay is introduced in the working data channels.

The Max power comparison unit 12 performs maximum power detection and decides when the new phase generator 11 updates the active phase register for PSC(s). It calculates $I^2+Q^2$ power for each sample data and determines the maximum power in every timeslot for the evaluation path and the working path respectively. Two data streams are processed by Max blocks respectively. One is the forward stream after combination of all N carriers in the working path. The other is the backward stream which is formed by combining PSCs (i.e., carriers 1 to M) data fetched out before phase shift by the forward phase shift unit 13 adjusted by a group of new phase values from the new phase register with other carriers data (i.e., carriers M+1 to N) after phase shift by the forward phase shift unit 13. After the Max power comparison unit 12 determines the two maximum powers, it will compare the two powers. If the power of the backward stream is smaller than that of the forward stream, the new group of new phases will be updated to the PSC part of the active phase register; otherwise all the active phases in the active phase register will remain.

In the embodiments of the invention, it is not necessary to adjust all the N carriers' phases each time. Preferably, adjusting 2 or 3 carriers' phases (i.e., 2 or 3 PSCs) is sufficient to achieve a significant PAR reduction. This also decreases the exhaustive search algorithm's complexity, calculating time and resources. It is also to be noted that the number of PSC may be 1.

In practice, the adaptive phase shift apparatus 10 according to embodiments of the invention may be embodied in a base station for reducing cost and complexity of implementation.

Figure 3:
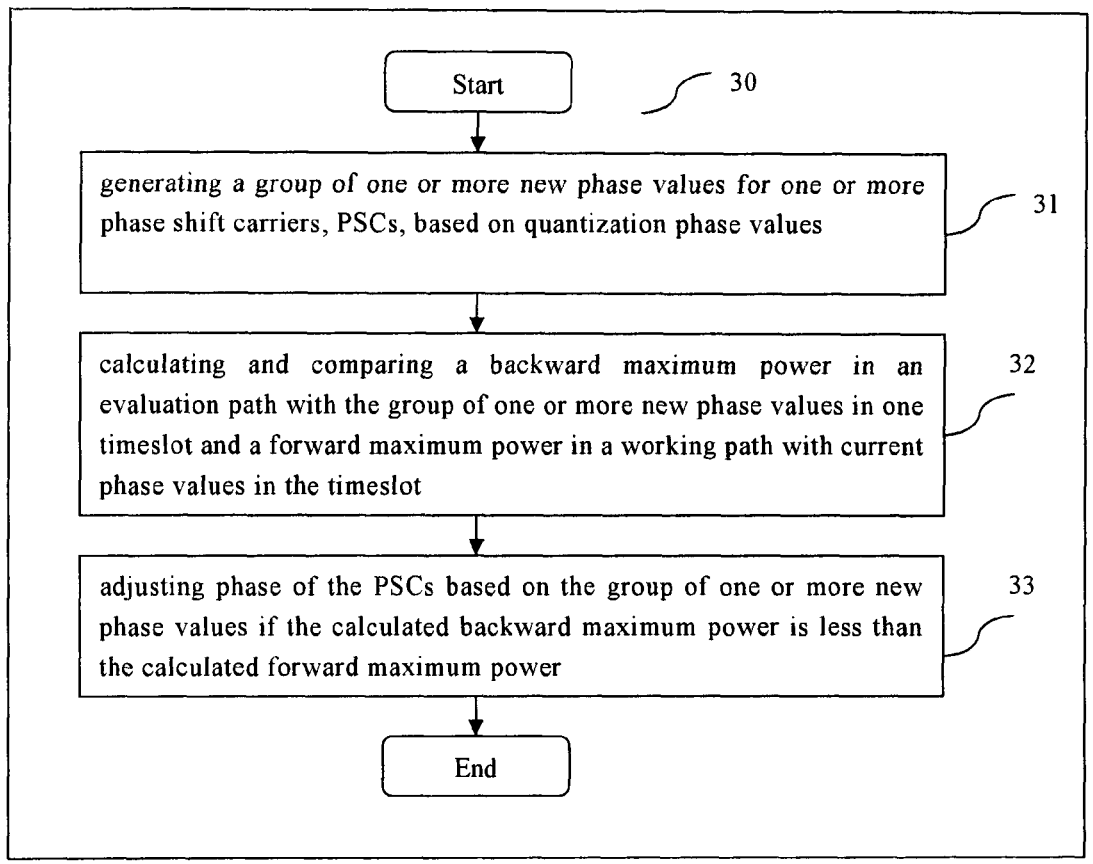
FIG. 3 illustrates a flowchart of an adaptive phase shift method for a multi-carrier system according to an embodiment of the invention.

FIG. 3 illustrates a flowchart of an adaptive phase shift method 30 for a multi-carrier (e.g., N-carrier) system according to an embodiment of the invention.

In the embodiment, the method 30 may be implemented in a Digital Front End, which may include following steps.

In step 31, a group of new phase values may be generated for phase shift carriers, PSCs, based on quantization phase values.

In an embodiment, the group of new phase values may be searched for in a phase quantization look up table. It is to be noted the group of new phase values may be generated in various manners, but not limited to the way disclosed herein.

In step 32, a maximum power in an evaluation path (i.e., the backward maximum power) may be calculated in one timeslot with the group of new phase values, and a maximum power in a working path (i.e., the forward maximum power) may be calculated with current phase values in the timeslot; and then the backward maximum power will be compared with the forward maximum power in the timeslot.

Particularly, the backward maximum power may be obtained by calculating power for each sample data in one timeslot based on the group of new phase values after combination of all N carriers, and determined the maximal power among the calculated powers for all the sample data in the timeslot as the backward maximum power. The forward maximum power may be obtained by calculating power for each sample data in one timeslot based on the current phase values after combination of all N carriers, and determined the maximal power among the calculated powers for all the sample data in the timeslot as the forward maximum power.

In step 33, the PSCs may be phase-shifted according to the group of new phase values if the backward maximum power calculated with the group of new phase values is less than the forward maximum power with the current phase values.

Preferably, all steps of the method may be performed in a cyclic manner until exhaustively searching all groups of new phase values in the phase quantization look up table.

In an embodiment, after one exhaustive searching is finished, the searching process may be restarted. This may at least eliminate or mitigate the problems caused by NCO frequency quantization error.

Further, the iteration process of calculating power and changing the phase shift may be performed by digital hardware without software, thus making the implementation faster.

Figure 4:
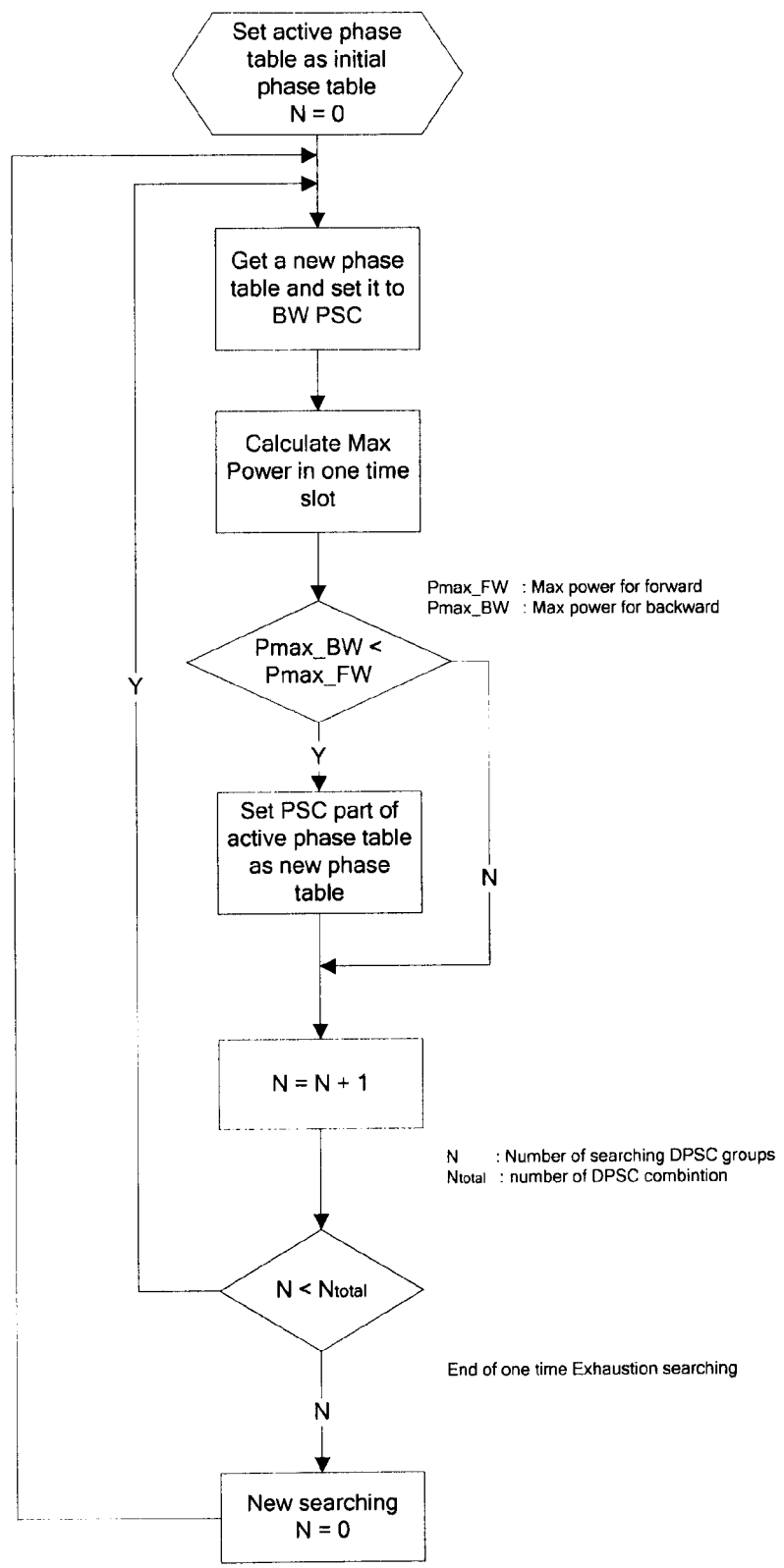
FIG. 4 illustrates an exemplary flowchart of an adaptive phase shift method for a multi-carrier system according to an embodiment of the invention.

FIG. 4 illustrates an exemplary flowchart of an adaptive phase shift method for a multi-carrier (e.g., N-carrier) system according to an embodiment of the invention.

One time-slot is a period of searching for one group of new phases. The Max power comparison unit 12 will estimate the PAR by calculating the maximum power in one timeslot.

When the system is initiated, the new phase generator 11 will initialize the active phase register with the initial N phase values in the initial phase table, which are then applied to the forward phase shift unit 13 as initial working phases. Then the new phase generator 11 may generate a group of new phases (e.g., M phases) and set it to backward PSCs. After that the Max blocks will begin to calculate the maximum power in one timeslot in the evaluation path and in the working path respectively. At the end of every timeslot, the Max blocks get the results (i.e., the backward maximum power and the forward maximum power) and then the compare block will compare the two results and decide if the new phase generator updates the active phase register with the group of new phases retrieved from the phase gain LUT. A counter may be configured to count the number of groups of the new phases. $N_{total}$ is the total number of the groups of the new phases that may be retrieved from the phase gain LUT. For example, if the phase Gain LUT include 16 phases and M is 3, the $N_{total}$ will be 16^3 which equals 4096. The first cycle is performed in one timeslot. Then, the second cycle starts in a next timeslot with N increased by 1. A complete searching process includes $N_{total}$ cycles. The new phase generator 11 fulfills one exhaustive searching when N reaches $N_{total}$. The searching process is a convergent process step by step. Each time the active phase register is updated, the PAR of the system goes better, and this will not impact on the actual system performance.

A new searching process starts after $N_{total}$ is reached in order to solve the NCO frequency quantization error problem. Continuative searching can adaptively adjust the phase even if carriers' relative phases changed. It may eliminate the PAR fluctuating caused by the NCO frequency quantization error and other adverse factors cause by carrier power changing.

Further, by using a counter implementing exhaustive searching of PSCs' phase combination, task of searching the optimal phase value is simplified, which lowers resource occupation for the FPGA or ASIC design without impacts on the searching process and the entire performance of the multi-carrier system.

In is to be noted that the features or functionality in one embodiment may be applied to another embodiment as appropriately.

It will be appreciated that the invention may be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the description do not imply any specific order in which the features/steps must be worked. Rather, the steps/features may be performed in any suitable order.

The terminology used herein is for the purpose of describing particular embodiments only and is not intended to limit to the invention. As used herein, the singular forms "a", "an" and "the" are intended to comprise the plural forms as well, unless otherwise stated. It will be further understood that the terms "including", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. An adaptive phase shift method in a multi-carrier system, comprising:
    generating a group of one or more new phase values for corresponding one or more phase shift carriers (PSCs) based on quantization phase values, wherein generating the group of one or more new phase values comprises identifying each phase value of the group of one or more new phase values in a phase quantization look up table containing phase values of equal portion of 360 degree;
    calculating and comparing, in real-time duration transmission, a backward maximum power in an evaluation path based on the group of one or more new phase values in a timeslot and a forward maximum power in a working path based on current phase values in the timeslot; and
    adjusting phases of the corresponding one or more PSCs based on the group of one or more new phase values if the calculated backward maximum power is less than the calculated forward maximum power,
    wherein the adjusting phases reduces data peak-to-average power ratio of the multi-carrier system.

2. The method of claim 1, wherein the method is implemented in a Digital Front End.

3. The method of claim 1, wherein a number of PSCs' phases are adjusted in parallel in one time, and the number of the PSCs' phases is smaller than a number of all carriers in the system.

4. The method of claim 1, wherein calculating the backward maximum power comprises:
- calculating power for each sample data in the timeslot based on the group of one or more new phase values after combination of all carriers; and
- determining the maximal power among the calculated powers for all the sample data in the timeslot as the backward maximum power.

5. The method of claim 1, wherein calculating the forward maximum power comprises:
- calculating power for each sample data in the timeslot based on the current phase values after combination of all carriers; and
- determining the maximal power among the calculated powers for all the sample data in the timeslot as the forward maximum power.

6. The method of claim 1, wherein steps of the method are performed in a cyclic manner until exhaustively searching all groups of one or more new phase values in the phase quantization look up table.

7. The method of claim 6, further comprising:
- restarting searching after one exhaustive searching is finished.

8. An adaptive phase shift apparatus for a multi-carrier system, comprising:
- a processor and a memory storing computer software, the memory coupled to the processor, the processor executing the computer software, the processor including:
  - a new phase generator, configured to generate a group of one or more new phase values for corresponding one or more phase shift carriers (PSCs) based on quantization phase values, wherein generating the group of one or more new phase values comprises identifying each phase value of the group of one or more new phase values in a phase quantization look up table containing phase values of equal portion of 360 degree;
  - a max power comparison unit, configured to calculate and compare, in real-time duration transmission, a backward maximum power in an evaluation path based on the group of one or more new phase values in a timeslot and a forward maximum power in a working path based on current phase values in the timeslot; and
  - a forward phase shift unit, configured to adjust phases of the corresponding one or more PSCs based on the group of one or more new phase values if the calculated backward maximum power is less than the calculated forward maximum power,
  - wherein the adjustment is to reduce data peak-to-average power ratio of the multi-carrier system.

9. The adaptive phase shift apparatus of claim 8, wherein the adaptive phase shift apparatus is included in a Digital Front End.

10. The adaptive phase shift apparatus of claim 8, wherein the forward phase shift unit is configured to adjust a number of PSCs' phases in parallel in one time, and the number of the PSCs' phases is smaller than a number of all carriers in the system.

11. The adaptive phase shift apparatus of claim 8, wherein the max power comparison unit is configured to:
- calculate power for each sample data in one timeslot based on the group of one or more new phase values after combination of all carriers; and
- determine the maximal power among the calculated powers for all the sample data in the timeslot as the backward maximum power.

12. The adaptive phase shift apparatus of claim 8, wherein the max power comparison unit is configured to:
- calculate power for each sample data in one timeslot based on the current phase values after combination of all carriers; and
- determine the maximal power among the calculated powers for all the sample data in the timeslot as the forward maximum power.

13. A base station comprising:
- an adaptive phase shift apparatus for a multi-carrier system, the adaptive phase shift apparatus comprising a processor and a memory storing computer software, the memory coupled to the processor, the processor executing the computer software, the processor including:
  - a new phase generator, configured to generate a group of one or more new phase values for corresponding one or more phase shift carriers (PSCs) based on quantization phase values, wherein generating the group of one or more new phase values comprises identifying each phase value of the group of one or more new phase values in a phase quantization look up table containing phase values of equal portion of 360 degree;
  - a max power comparison unit, configured to calculate and compare, in real-time during transmission, a backward maximum power in an evaluation path based on the group of one or more new phase values in a timeslot and a forward maximum power in a working path based on current phase values in the timeslot; and
  - a forward phase shift unit, configured to adjust phases of the corresponding one or more PSCs based on the group of one or more new phase values if the calculated backward maximum power is less than the calculated forward maximum power,
  - wherein the adjustment is to reduce data peak-to-average power ratio of the multi-carrier system.

14. The base station of claim 13, wherein the apparatus is included in a Digital Front End of the multi-carrier system.

15. The base station of claim 13, wherein the forward phase shift unit is configured to adjust a number of PSCs' phases in parallel in one time, and the number of the PSCs' phases is smaller than a number of all carriers in the system.

16. The base station of claim 13, wherein the max power comparison unit is configured to:
- calculate power for each sample data in one timeslot based on the group of one or more new phase values after combination of all carriers; and
- determine the maximal power among the calculated powers for all the sample data in the timeslot as the backward maximum power.

17. The base station of claim 13, wherein the max power comparison unit is configured to:
- calculate power for each sample data in one timeslot based on the current phase values after combination of all carriers; and
- determine the maximal power among the calculated powers for all the sample data in the timeslot as the forward maximum power.

* * * * *

UNITED STATES PATENT AND TRADEMARK OFFICE
CERTIFICATE OF CORRECTION

PATENT NO.       : 9,313,073 B2                                            Page 1 of 1
APPLICATION NO.  : 14/371232
DATED            : April 12, 2016
INVENTOR(S)      : Xu et al.

It is certified that error appears in the above-identified patent and that said Letters Patent is hereby corrected as shown below:

Claims
In Column 10, Line 42, in Claim 14, delete "the" and insert -- the adaptive phase shift --, therefor.

Signed and Sealed this
Second Day of August, 2016

Michelle K. Lee
*Director of the United States Patent and Trademark Office*